United States Patent
Wang et al.

(10) Patent No.: US 9,333,482 B2
(45) Date of Patent: May 10, 2016

(54) SYNTHESIS OF ULTRA-SMALL PORE ALUMINOSILICATES BY CONTROLLED STRUCTURAL COLLAPSE OF ZEOLITES

(71) Applicants: Saudi Arabian Oil Company, Dhahran (SA); Korea Advanced Institute of Science and Technology, Daejeon (KR)

(72) Inventors: Yuguo Wang, Dhahran (SA); Cemal Ercan, Dhahran (SA); Rashid M. Othman, Khobar (SA); Minkee Chol, Daejeon (KR); Hyeonbin Kim, Daejeon (KR)

(73) Assignees: SAUDI ARABIAN OIL COMPANY (SA); KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 0 days.

(21) Appl. No.: 14/605,645

(22) Filed: Jan. 26, 2015

(65) Prior Publication Data

US 2015/0367321 A1  Dec. 24, 2015

Related U.S. Application Data (63) Continuation-in-part of application No. 14/311,980, filed on Jun. 23, 2014.

(51) Int. Cl.

| | | |
|---|---|---|
| *B01D 53/02* | (2006.01) | |
| *B01J 20/16* | (2006.01) | |
| *B01J 20/30* | (2006.01) | |
| *C10L 3/10* | (2006.01) | |
| *B01J 20/18* | (2006.01) | |
| *B01D 53/04* | (2006.01) | |
| *B01J 20/28* | (2006.01) | |

(52) U.S. Cl.
CPC ............ *B01J 20/16* (2013.01); *B01D 53/02* (2013.01); *B01D 53/04* (2013.01); *B01J 20/186* (2013.01); *B01J 20/2808* (2013.01); *B01J 20/3078* (2013.01); *B01J 20/3085* (2013.01); *C10L 3/104* (2013.01); *C10L 3/105* (2013.01); *B01D 2253/106* (2013.01); *B01D 2253/108* (2013.01); *B01D 2253/1085* (2013.01); *B01D 2253/308* (2013.01); *B01D 2257/40* (2013.01); *B01D 2257/504* (2013.01); *C10L 2290/542* (2013.01)

(58) Field of Classification Search
CPC ............... B01D 2253/1085; B01D 2257/504; B01D 53/02; B01J 20/16; B01J 20/3078; B01J 20/3085; C10L 2290/542; C10L 3/104
See application file for complete search history.

(56) References Cited

U.S. PATENT DOCUMENTS

| | | | | |
|---|---|---|---|---|
| 3,544,650 | A | * 12/1970 | Garwood | ............... B01J 20/186 502/200 |
| 4,515,681 | A | 5/1985 | Cody | |
| 4,790,928 | A | * 12/1988 | Chang | ...................... B01J 29/40 208/111.35 |
| 4,938,939 | A | 7/1990 | Kuznicki | |
| 6,017,508 | A | 1/2000 | Millar et al. | |
| 6,068,682 | A | 5/2000 | Kuznicki et al. | |
| 6,136,291 | A | * 10/2000 | Chester | .................... B01J 29/08 423/713 |
| 6,395,070 | B1 | * 5/2002 | Bhadha | .................. B01D 53/02 502/78 |
| 6,610,124 | B1 | 8/2003 | Dolan et al. | |
| 8,552,246 | B2 | 10/2013 | Kuznicki et al. | |
| 2010/0269694 | A1 | 10/2010 | Sawada et al. | |
| 2011/0185896 | A1 | 8/2011 | Sethna et al. | |
| 2013/0280160 | A1 | 10/2013 | Ko Ariga et al. | |

OTHER PUBLICATIONS

Jee SE et al., "Carbon dioxide and methane transport in DDR zeolite: insights from molecular simulations into carbon dioxide separations in small pore zeolites.," J Am Chem Soc., School of Chemical and Biomolecular, Georgie Institute of Technology; Jun. 10, 2009; 1 page.
http://www.apipl.biz/zeolites_molecular.html; "Zeolites/Molecular Sieves/Catalyst support/Catalysts," Agarwal Pharchem Pvt. Ltd.; 1 page.
Matthew Simon Turnbull, "Hydrogen Storage in Zeolites: Activation of the Pore Space Through Incorporation of Guest Materials," Thesis submission to Univeristy of Birmingham School of Chemistry, College of Engineering and Physical Science; Mar. 2010; 262 pages.

* cited by examiner

*Primary Examiner* — Christopher P Jones
(74) *Attorney, Agent, or Firm* — Bracewell LLP; Constance Gall Rhebergen; Brad Y. Chin (57) ABSTRACT

The present invention relates to an amorphous adsorbent composition capable of purifying a gaseous hydrocarbon fraction and methods for synthesizing the composition. The composition is advantageously capable of filtering non-combustible contaminants for increasing the quality and heating value of a gaseous hydrocarbon such as methane. The composition comprises a zeolite based framework that is at least partially collapsed and capable of selectively adsorbing and desorbing gaseous components such as methane and carbon dioxide for purifying the gaseous hydrocarbon fraction.

14 Claims, 7 Drawing Sheets

SYNTHESIS OF ULTRA-SMALL PORE ALUMINOSILICATES BY CONTROLLED STRUCTURAL COLLAPSE OF ZEOLITES

RELATED APPLICATIONS

The present application is a continuation-in-part of U.S. patent application Ser. No. 14/311,980, filed Jun. 23, 2014, the disclosure of which is incorporated herein by reference in its entirety.

BACKGROUND OF THE INVENTION

1. Field of the Invention

The field of invention relates to zeolites. More specifically, the field relates to partially collapsed zeolites for the purification of hydrocarbon based gaseous fractions such as natural gas.

2. Description of the Related Art

Almost one quarter of the total worldwide production of energy is met through natural gas production. The regulations for the transportation of natural gas that occurs mainly through pipelines vary by country. In many countries and jurisdictions, there are specific restrictions to the amounts of inert chemical species such as nitrogen ($N_2$) and carbon dioxide ($CO_2$) that may be transported. Nitrogen is typically found in wellhead gas in a concentration range of about 0.5 to 5 mole percent and may approach concentrations of up to 30 mole percent. Sub-quality natural gas is a composition that exceeds pipeline specifications for contaminants such as $CO_2$, hydrogen sulfide ($H_2S$) and nitrogen. For instance, sub-quality natural gas often has a nitrogen concentration exceeding 4 mole percent and a $CO_2$ concentration in a range of about 0.2 mole percent to about 1 mole percent with respect to the wellhead gas. Both nitrogen and $CO_2$ have no heating value and therefore reduce the thermal quality of the wellhead gas. In addition, $CO_2$ is an "acid gas" that, in the presence of water, forms carbonic acid. The resulting acid reacts rapidly with carbon steel and other metals susceptible to acidification and produces corrosion, a common problem in areas along a pipeline where pools of aqueous liquids may form.

$CO_2$ is normally removed during natural gas refinement and processing by the process of amine scrubbing using gas-liquid contactors operating at a temperature range of from about 323 K to about 333 K. The resulting (saturated) alkanolamine is regenerated in a temperature range of from about 383 K to about 403 K and releases the purified carbon dioxide. This energy intensive process typically involves the handling of a corrosive and toxic solvent. In addition, the removal of nitrogen from methane, the primary component in natural gas is very difficult. The only commercial process commonly used for separating nitrogen from methane is cryogenic distillation, where a turboexpander reduces the temperature of the gas to about 220 K. The nitrogen-poor product stream must be recompressed to transport it through pipelines effectively. Both turboexpansion and recompression are energy-intensive and therefore increase the costs associated with natural gas processing.

Adsorption processes using zeolites are capable of performing certain $CH_4$—$CO_2$ and $CH_4$—$N_2$ separations. For instance, Molecular Gate® (Engelhard Corp.; Iselin, N.J.) uses titanosilicate-based zeolites (ETS and CTS configurations) doped with transition metals that allow for the micropores of the zeolite to be adjusted based upon activation temperature. Other adsorbents include carbon based molecular sieves for $CH_4$—$N_2$ separations. A pressure swing adsorption (PSA) system using metal-exchanged clinoptilolites, a natural zeolite largely comprised of silica and alumina, has also shown some promise for $CH_4$—$N_2$ separation. In addition, CMS 3A (carbon molecular Sieve 3A) has been evaluated for performing $CH_4$—$CO_2$ separation.

As a selective adsorbent of $N_2$ and $CO_2$, zeolite-based materials are attractive candidates. Zeolite 13X, which is an aluminosilicate zeolite, has been shown to reduce carbon dioxide levels in flue gases at low temperatures. Zeolites are thermochemically stable, available in the market and their surfaces can be controlled through post-modifications such as ion-exchange. Zeolites have well-defined microporous structures with mean diameters in a range of from about 0.3 nanometers (nm) to about 1.5 nm, allowing a zeolite material to advantageously provide a molecular sieve type effect for separating certain unwanted constituents found in natural gas.

Despite the advantages of zeolites, the separation of $N_2$ and $CO_2$ from $CH_4$ remains challenging. For instance, the extremely small difference between the kinetic diameters of the compounds ($CO_2$: 0.33 nm; $N_2$: 0.36 nm; $CH_4$: 0.38 nm) requires precision in forming zeolite apertures. It should be noted that the pore diameter of zeolites and similar materials is difficult to control in the ultra-small pore range (e.g. materials with mean diameters less than 0.38 nm). The attraction of a titanosilicate-type ETS-4 zeolite for small molecular separations is attributable to its pore size tuning. However, two significant problems are associated with the broad use of titanosilicate materials: 1) they have lower thermal stability, so it is more difficult to use them in processes that apply thermal cycling to promote adsorption aid desorption; and 2) these materials can be costly and not readily available. In this regard, aluminosilicate-based zeolites are advantageously more commercially available and less expensive than titanosilicate-based zeolites.

SUMMARY OF THE INVENTION

The present invention relates to amorphous adsorbent compositions capable of purifying a gaseous hydrocarbon fraction and methods for synthesizing these compositions. In some embodiments, a composition in accordance with the present invention comprises a hydrolyzed, partially collapsed Linde Type A aluminosilicate zeolite, and a plurality of pores characterized by a pore aperture size of from about 0.33 nm to about 0.38 nm. In further embodiments, the composition is characterized by a carbon dioxide/methane equilibrium selectivity factor in a range of about 3.8 to about 40. In still further embodiments, the composition has a Na/Al ratio in a range of from about 0.60 to about 1.00. In further embodiments, the composition is hydrolyzed using deionized water. In additional embodiments, the deionized water is present in a phase selected from the group consisting of liquid, saturated steam and superheated steam.

In some embodiments, the composition is decationized and calcined prior to hydrolysis. In additional embodiments, the composition is calcined at a temperature between about 473 K and about 773 K. In further embodiments, the composition is operable at a temperature in a range of between about 273 K and about 323 K and a pressure in a range of between about 1 bar and about 8 bars. In some embodiments, the composition further comprises one or more cations selected from sodium, ammonium, and combinations thereof.

In some embodiments, the invention relates to a method for synthesizing an amorphous adsorbent material capable of purifying a gas fraction comprising combining at least a stoichiometric amount of a compound comprising at least one exchangeable cation with a stoichiometric amount of a sodium Linde Type A aluminosilicate zeolite compound under temperature and pressure conditions suitable for promoting cation exchange between the compound comprising at least one exchangeable cation and the sodium Linde Type A aluminosilicate zeolite compound; isolating the Linde Type A aluminosilicate zeolite compound comprising the exchangeable cation; calcinating the Linde Type A aluminosilicate zeolite compound comprising the exchangeable cation under conditions such that the Linde Type A aluminosilicate zeolite compound undergoes at least a partial structural collapse and the exchangeable cation is removed to form a calcinated amorphous adsorbent precursor; and hydrolyzing the calcinated amorphous adsorbent precursor under conditions appropriate for forming a plurality of pores characterized by a pore aperture size of from about 0.33 nm to about 0.38 nm. In further embodiments, the compound comprising at least one exchangeable canon is ammonium nitrate. In still further embodiments, the calcination step is performed at a temperature in a range of about 473 K to about 773 K and at a pressure in a range of about 1 bar to about 8 bars, preferably at a pressure of about 1 bar.

In some embodiments, the invention relates to a method for purifying a natural gas fraction comprising the steps of introducing a natural gas traction into a vessel containing the composition of claim 1, where the introduced natural gas is a non-upgraded natural gas comprising non-combustible gases and where the amorphous adsorbent is characterized by a carbon dioxide/methane equilibrium selectivity factor in a range of about 3.8 to about 40; contacting the natural gas fraction with the composition of claim 1; and maintaining the natural gas fraction in the vessel containing the composition of claim 1 for a sufficient time such that the concentrations of the non-combustible gases are reduced in the natural gas fraction. The non-upgraded natural gas fraction may refer to a natural gas traction that is previously unrefined, previously unprocessed, incompletely refined or incompletely processed.

A highly selective, ultra-small pore amorphous adsorbent composition in accordance with the present invention, is useful for upgrading a sub-quality natural gas. The amorphous adsorbent of gaseous contaminants at operating conditions selectively removes at least a portion of contaminants including but not limited to nitrogen and carbon dioxide from the natural gas introduced to it, thereby upgrading the quality of the natural gas for downstream users. The adsorbent material is amorphous and allows for higher hydrothermal stability, e.g. in systems that apply thermal cycling as part of an adsorption/desorption process. The use of repeated thermal variations over time in such processes does not modify the pore structure. The amorphous adsorbent is advantageously environmentally friendly and non-toxic, unlike many commercially available salt- and solvent-based removal systems.

BRIEF DESCRIPTION OF THE DRAWINGS

So that the manner in which the features, advantages and compositions of the invention, as well as others which will become apparent, are attained, and can be understood in more detail more particular description of the invention briefly summarized above may be had by reference to the embodiments thereof which are illustrated in the appended drawings that form a part of this specification. If is to be noted, however, that the drawings illustrate only a preferred embodiment of the invention and are therefore not to be considered limiting of its scope as the invention may admit to other equally effective embodiments. The present technology will be better understood on reading the toll owing detailed description of non-limiting embodiments thereof, and on examining the accompanying drawings, in which.

DETAILED DESCRIPTION OF THE INVENTION

Although the following detailed description contains specific details for illustrative purposes, the skilled artisan will appreciate that many examples, variations and alterations to the following details are within the scope and spirit of the invention. Accordingly, the exemplary embodiments of the invention described herein and provided in the appended figures are set forth without any loss of generality, and without undue limitations, on the claimed invention. The referenced elements, components or steps may be present utilized or combined with other elements, components or steps not expressly referenced.

As used herein, the term "decationize" and its conjugated forms such as "decationization" refers to the process of removing an electrostatically coordinated or adventitiously associated cation from a material. While in no way limiting the context of the present invention to any particular methodology or physicochemical process, decationization may be performed using chemical and/or thermal treatment, including but not limited to solvent washing or solvation as well as heating a composition under conditions capable of thermally evolving a cation such as calcination.

As used herein, the term "operable" and its conjugated forms should be interpreted to mean fit for its proper functioning and able to be used for its intended use. The term "maintain" and its conjugated forms should be interpreted to mean conditions capable of causing or enabling a condition or situation to continue. As used herein, the term "detect" and its conjugated forms should be interpreted to mean the identification of the presence or existence of a characteristic or property. The term "determine" and its conjugated forms should be interpreted to mean the ascertainment or establishment through analysis or calculation of a characteristic or property.

Where the specification or claims provide a range of values, it is understood that the interval encompasses each intervening value between the upper limit and the lower limit as well as the upper limit and the lower limit. The invention encompasses and bounds smaller ranges of the interval subject to any specific exclusion provided. Where a method comprising two or more defined steps is referenced herein, the defined steps can be carried out in any order or simultaneously except where the context expressly excludes that possibility.

The present invention relates to a method for using the controlled structural collapse of a crystalline aluminosilicate zeolite to form a highly selective, ultra-small pore size amorphous adsorbent. In one embodiment, the aluminosilicate zeolite is a Linde Type A zeolite, and commercially-available, small-pore size (pore diameter=4 Å) sodium Linde Type A zeolites (alternatively referenced herein as "NaA") may be used as the precursor for forming the amorphous adsorbent. NaA is known to have a high gas adsorption capacity but a low selectivity for heterogeneous gas fractions including those of 1) methane and $CO_2$; and 2) methane and $N_2$.

The method for forming the amorphous adsorbent includes ion-exchange, calcination and liquid $H_2O$ treatment (under ambient or heated conditions) of the precursor to irreversibly transform the crystalline aluminosilicate zeolite with a small pore size into the highly selective, ultra-small pore size amorphous adsorbent. In alternative embodiments, the liquid $H_2O$ treatment of the precursor may be replaced with steam treatment, including superheated steam. The resulting composition can adsorb natural gas components under moderate temperature and elevated pressure conditions such that a greater-than-expected selectivity for $CO_2$ over methane occurs. Under similar conditions, a higher selectivity for $N_2$ over methane would likewise occur.

In a preferred embodiment, the starting material for the formation of the highly selective, ultra-small pore amorphous adsorbent composition of the present invention is NaA. The zeolite is typically synthesized using hydrothermal crystallization techniques from a synthesis gel composition comprising stoichiometric ratios of $(3-4)Na_2O:Al_2O_3:(1.8-3.0)SiO_2:(50-200)H_2O$, where the parenthetical values represent stoichiometric ranges for each of the chemical components. The crystallization of the zeolite from the gel occurs over a time period of about 3-24 hours in a temperature range of about 353 K to about 373 K, resulting in generally cubic crystals exhibiting an average crystal diameter size of 1-3 micrometers (μm), an X-ray defection (XRD) pattern of strong reflections at d=4.107, 3.714, 3.293 and 2.987 Å, and Si/Al and Na/Al stoichiometric ratios of about 1.00.

The highly selective, ultra-small pore amorphous adsorbent composition of the present invention may be formed by initially reacting an ion-exchange material having an exchangeable cation with an aluminosilicate zeolite having a cation, for instance NaA such that the cationic exchange results in an ion-exchanged zeolite. A higher degree of (thermodynamically driven) cation exchange correlates to a greater degree of structural collapse to produce the amorphous form of the crystalline zeolite during the subsequent calcination step. The degree of cation exchange is dependent on both the temperature and the cation concentration in the ion-exchange material. The "cation/Al ratio" is the stoichiometric ratio of the exchangeable zeolite cation to aluminum in the zeolite, for instance, a sodium aluminosilicate zeolite such as NaA is expressed as a "Na/Al ratio".

As the cation exchange progresses the ratio will be reduced as the (zeolite) cation is exchanged for the (ion-exchange material) cation. Generally, higher concentrations of the cation of the ion-exchange material result in higher cation exchange with the crystalline zeolite. However, based upon the type of ion-exchange material used and the cation exchange conditions, the resulting exchanged cation/Al ratio may be lower than expected due to factors including but not limited to transport phenomenon effects inside the crystalline zeolite.

In some embodiments, the exchangeable cation of the ion-exchange material is an ammonium ($NH_4^+$) ion. In reacting an $NH_4^+$ containing ion-exchange material with a sodium aluminosilicate zeolite such as NaA, the Na/Al ratio will decrease with an increased degree of $NH_4^+$ substitution for the $Na^+$ cation of the crystalline zeolite. In one embodiment, the amorphous adsorbent has a Na/Al ratio in a range of from about 0.60 to about 1.00. In further embodiments, the amorphous adsorbent has a Na/Al ratio in a range of from about 0.60 to about 0.77.

The method of forming the highly selective, ultra-small pore amorphous adsorbent composition of the present invention includes calcinating the ion-exchanged zeolite at a calcination temperature such that the ion-exchanged zeolite partially collapses and forms a decationized adsorbent. The steps of cation exchange and subsequent calcination such that at least some of the positive ion is removed from the ion-exchanged zeolite are collectively referred to as the "decationization" of the zeolite. Decationization is characterized by the partial collapse of the crystalline zeolite into an amorphous, unstructured material. The structural portions of the amorphous adsorbent composition where the cation exchange occurs are irreversibly degraded.

In some instances, the cation-exchanged zeolite may begin collapsing at temperatures greater than about 373 K. In some embodiments, the calcination temperature is in a range of from about 473 K to about 773 K, for instance about 673 K. Alternatively, thermally collapsing a sodium aluminosilicate zeolite such as NaA in the absence of cation exchange requires high calcination temperatures, for example temperatures greater than about 973 K. However, the resulting collapsed zeolite structure is non-porous and therefore unsuitable for performing molecular separations.

In some embodiments, the cation used in the ion-exchange material is an ammonium ion ($NH_4^+$). While not limited the present invention to any particular theory, it is believed that calcination of the ion-exchanged zeolite causes the $NH_4^+$ ion to thermally degrade into ammonia ($NH_3$) and a hydrogen ion ($H^+$). The resulting ammonia evolves from the collapsing zeolite, while the hydrogen ion is integrated into the partially-collapsed zeolite structure. The degree of structural collapse during decationization correlates to the degree of cation exchange that occurs.

In some embodiments, a method for forming a highly selective, ultra-small pore amorphous adsorbent composition of the present invention includes introducing water to the decationized adsorbent such that the decationized adsorbent collapses to form the composition. Treatment of the decationized adsorbent with water ($H_2O$) having no significant mineral, salt or free ion content was found to enhance the structural collapse of the decationized adsorbent by degradation of the silicon/aluminum based structure, while the cation exchange and the calcination steps remove residual (non-ammonium) cations with large atomic radii in the crystalline zeolite material.

The introduction of water following calcination results in the hydrolysis of destabilized Si—O—Al bonds that are present in the decationized adsorbent. The hydrolysis of susceptible Si—O—Al bonds may lead to additional pore size narrowing for enhancing the selectivity properties of the amorphous adsorbent composition without adversely impacting the adsorption capacity of the material.

As used herein, the term "Si/Al ratio" refers to the molecular ratio of silicon to aluminum in compositions such as zeolites and compositions of the present invention. For instance, the Si/Al ratio in the original zeolite is about 1.00. In certain embodiments, the Si/Al ratio of the amorphous adsorbent composition of the present, invention is in a range of from about 1.00 to about 1.03.

Following the decationization and post-calcination water treatment of the precursor material, the original crystalline zeolite framework collapses and forms an amorphous adsorbent composition in accordance with the present invention. The degree of structural collapse can be controlled at each step by the degree of cation exchange in the crystalline zeolite, the extent of decationization during calcination, and the hydrolysis of susceptible silicon-aluminum bonds.

The methods described herein transform cation-bearing aluminosilicate zeolites such as sodium aluminosilicate zeolites with small pores apertures (less than 4 Å), into aluminosilicate based materials characterized by enhanced density and increased amorphous domains. The resulting dense, amorphous structure advantageously restricts diffusion to molecules with small diameters, including but not limited to $H_2$ (2.89 Å), $H_2O$ (2.7 Å), $CO_2$ (3.3 Å), $O_2$ (3.46 Å), $N_2$ (3.64 Å), Ar (3.3 Å) and $CH_4$ (3.8 Å). The pore aperture size of the claimed composition allows the adsorption of contaminant gases while restricting the adsorption of methane. In some embodiments, a highly selective, ultra-small pore amorphous adsorbent composition in accordance with the present invention has a pore aperture size in a range of from about 0.33 nm to about 0.38 nm. In further embodiments, the composition has carbon dioxide/methane equilibrium selectivity factor in a range of from about 3.8 to about 40 at a temperature of about 323 K and a pressure of about 8 bars.

In preferred embodiments, the amorphous adsorbent cannot revert back to a Linde Type A structure. For instance, the structural configuration of titanium-based zeolites like ETS-1 and CTS-1 can rearrange with temperature and/or pressure variations and alter the adsorption properties of these zeolites drastically and unpredictably. In contrast, the amorphous adsorbent compositions of the present invention advantageously retain their adsorptive properties under the variable and wide ranging temperatures and pressures that often characterize chemical separation processes, including conditions associated with gas adsorption/desorption systems.

In certain embodiments, the present invention relates to methods for improving the quality of a natural gas fraction or stream comprising introducing the natural gas fraction or stream into a vessel comprising a highly selective, ultra-small pore amorphous adsorbent composition such as those described herein. The method includes maintaining the natural gas fraction or stream in the vessel for a sufficient amount of time such that the natural gas contacts the amorphous adsorbent to produce a purified natural gas. The natural gas fraction or stream may or may not be previously refined or purified.

In some embodiments, the natural gas fraction or stream is a non-upgraded natural gas comprising a first mole percent of carbon dioxide that, in certain embodiments, are converted in an upgraded natural gas traction or stream with a second mole percent of carbon dioxide using the methods described herein. In some embodiments, the first mole percent of carbon dioxide is greater than the second mole percent of carbon dioxide. In further embodiments, the methods for improving the quality of a natural gas fraction or stream are characterized by a residence time in a range of about two minutes to about 30 minutes.

EXAMPLES

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Samples 1 through 5 are decationized materials that have been treated using ion-exchange and calcination procedures, while Samples 6 through 10 are five ultra-small pore amorphous adsorbents that have been treated with water following calcination. The Reference Sample (described as "Reference" in FIGS. 1A through 4B) is the zeolite precursor material used to synthesize Samples 1 through 10. The samples were synthesized using the same procedure for each of Samples 1 through 10 except for variations in the concentrations of ammonium nitrate ($NH_4NO_3$). Each sample was synthesized by initially suspending 1 gram of the sodium Linde Type A (NaA) zeolite in 20 mL of $NH_4NO_3$ solution at the various molar concentrations given in Table 1. The resulting suspension was stirred for six hours at room temperature to form ion-exchanged zeolite precursors, where the ammonium ($NH_4^+$) ion substitutes for the sodium ($Na^+$) ion to varying degrees based upon the ammonium nitrate concentration. The precursors are collected by filtration, washed with deionized water followed by acetone, and dried at 333 K for 24 hours. The dried, ion-exchanged zeolite precursors am then calcined in a plug-flow reactor under flowing dry air (25 mL/minute) at 673 K (temperature ramp: 1 K/minute) for 2 hours to produce Samples 1 through 5. An additional fraction of 1 gram calcined precursors were stirred in 300 mL room temperature water ($H_2O$) for 6 hours, collected by filtration, washed with deionized water and dried at 373 K for 24 hours to produce Samples 6 through 10.

Elemental analyses were performed on the Reference Sample and Samples 1 through 10 using inductively coupled plasma atomic emission spectroscopy (ICP-AES). The compositional results for Samples 1-5 were, within standard error, the same as those of Samples 6-10. For instance, the Si/Al ratio of the (10) samples were all very close to 1.00, which is the Si/Al ratio of starting zeolite material. The ratio of Si/Al and Na/Al did not change significantly during the calcination and the post-calcination water treatment procedures.

Figure 1A:
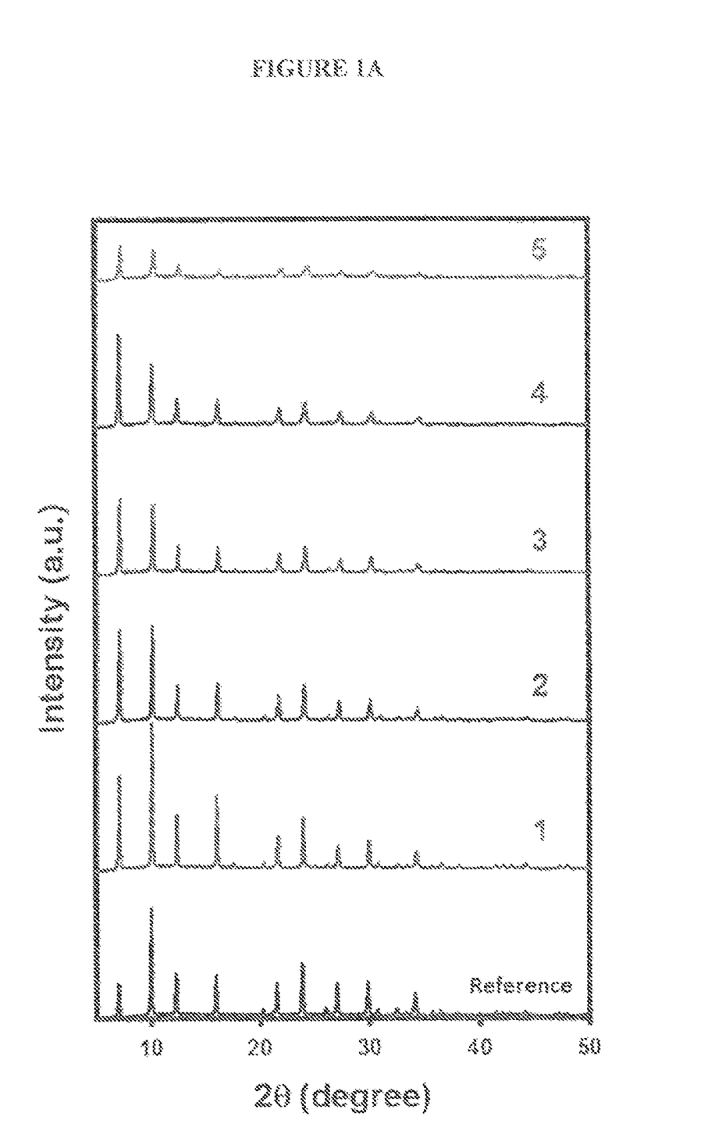
FIG. 1A shows X-ray diffraction (XRD) patterns for a Linde Type A zeolite ("Reference") and Samples 1 through 5.
Figure 1B:
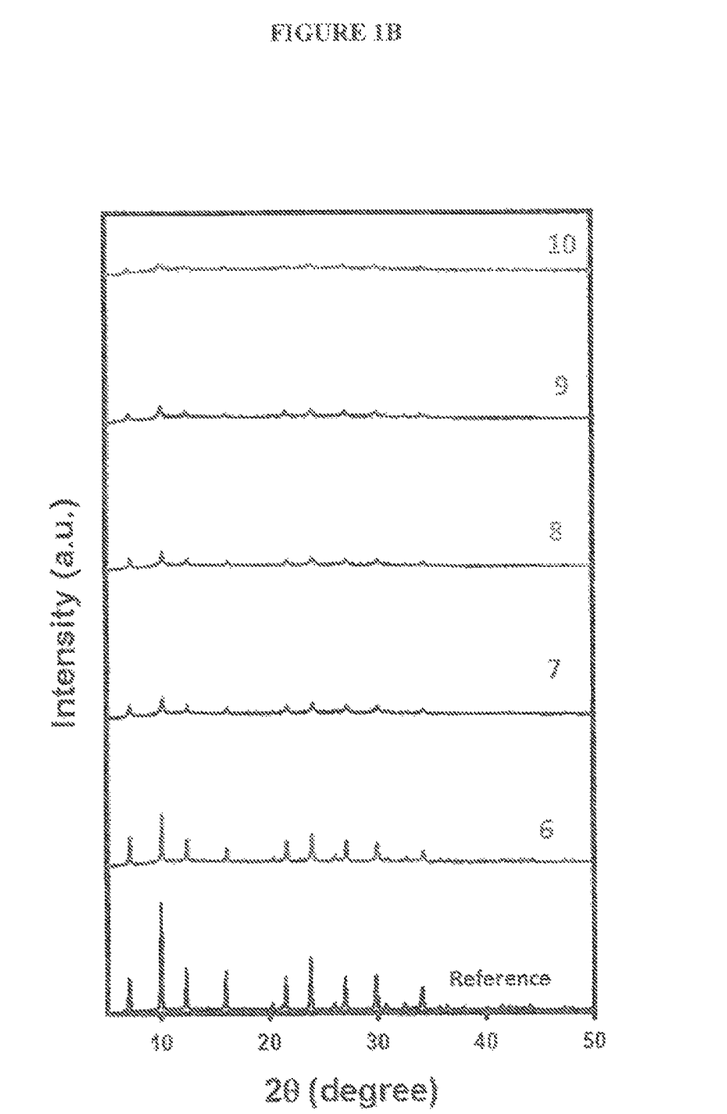
FIG. 1B shows X-ray diffraction (XRD) patterns for a Linde Type A zeolite ("Reference") and Samples 6 through 10.

The Na/Al ratio gradually decreases as the degree of $NH_4^+$ ion-exchange increases because of the removal of $Na^+$ cation during the decationization procedure. In addition, powder X-ray diffraction (XRD) patterns were recorded for the Reference Sample and Samples 1 through 10 using a D2-phaser (Bruker) equipped with Cu radiation (30 kV, 10 mA) and a LYNXEYE detector. The resulting diffraction patterns for Samples 1-5 are shown in FIG. 1A, while the patterns for Samples 6-10 are given in FIG. 1B. Each trace has been off-set by a fixed intensity value for the purposes of clarity of the drawing and has the same original value at 2θ=5. The XRD patterns for Samples 1-5 revealed that the spectral intensities of the characteristic NaA peaks were mostly intact even after significant decationization. However, the XRD analysis for Samples 6-10 revealed that the intensities of the characteristic NaA zeolite peaks significantly decreased and became broader as the degree of decationization increased, indicating that Linde Type A (LTA) zeolites gradually loses their crystallinity (i.e., their long-range structural ordering) during decationization and subsequent water treatment procedures and their structural framework appears to resemble that of amorphitized aluminosilicate.

TABLE 1

Ammonium nitrate concentrations used for the synthesis of and the resulting elemental analysis ratios for the Reference Sample and Samples 1 through 10 as determined via ICP-AES.

| Example | $NH_4NO_3$ Concentration (M) | Na/Al ratio | Si/Al ratio |
| --- | --- | --- | --- |
| Reference Sample | — | 1.00 | 1.00 |
| Sample 1 Sample 6 | 0.14 | 0.77 | 1.03 |
| Sample 2 Sample 7 | 0.21 | 0.71 | 1.02 |
| Sample 3 Sample 8 | 0.28 | 0.65 | 1.03 |
| Sample 4 Sample 9 | 0.35 | 0.63 | 1.01 |
| Sample 5 Sample 10 | 0.42 | 0.60 | 1.01 |

Figure 2A:
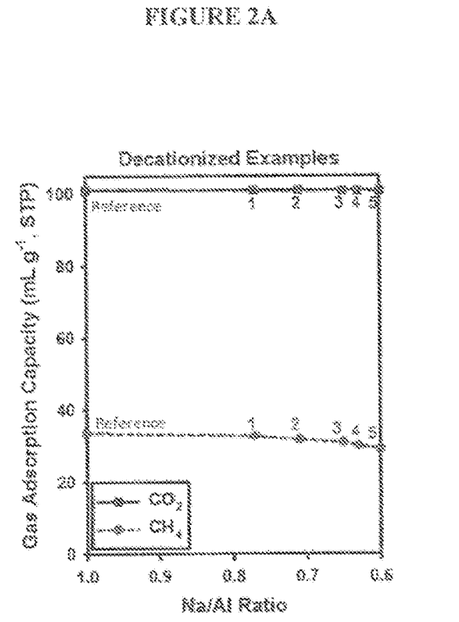
FIG. 2A shows $CO_2$ and $CH_4$ equilibrium gas adsorption capacity plots for a Linde Type A zeolite ("Reference") and Samples 1 through 5 at a temperature (T) of 323 K and a pressure (P) of 8 bars.

FIG. 2A shows $CO_2$ and $CH_4$ equilibrium gas adsorption capacity isotherms for the Reference Sample ("Reference") and Samples 1-5 at a temperature of 323 K and a pressure of 8 bars. The observed $CO_2$ and the $CH_4$ gas adsorption capacities did not significantly change despite extensive decationization. This result indicates that, while $NH_4^+$ exchange followed by calcination can lead to the decationization of the zeolite precursors, the resulting pore structure collapse and pore size narrowing are not significant.

Figure 2B:
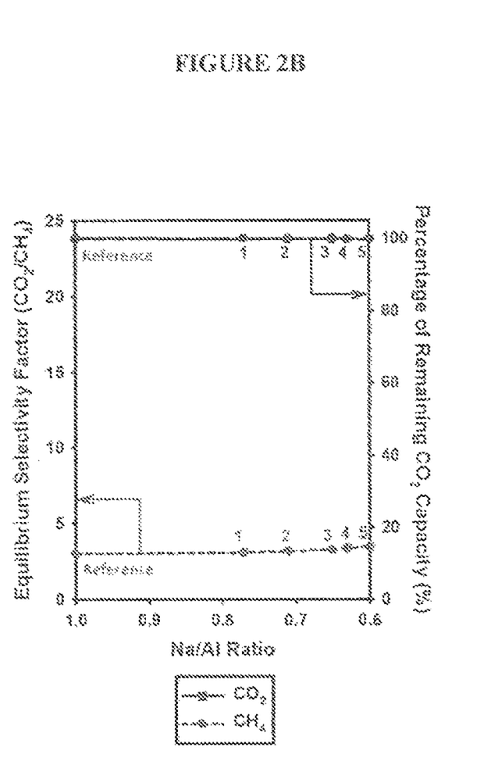
FIG. 2B shows a $CO_2/CH_4$ equilibrium selectivity factor plot for a Linde Type A zeolite ("Reference") and Samples 1 through 5 aid the percentage of remaining $CO_2$ capacity for a Linde Type A zeolite ("Reference") and Samples 1 through 5 at T=323 K and P=8 bars.
Figure 3:
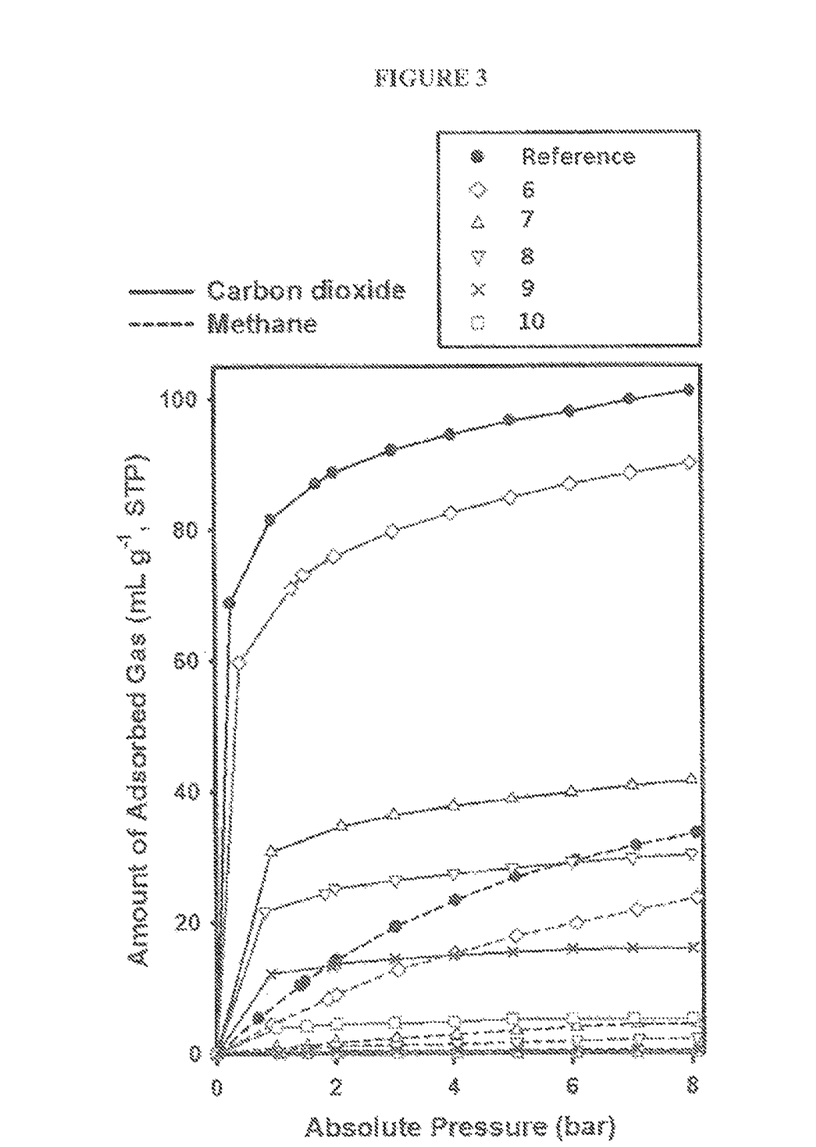
FIG. 3 shows $CO_2$ and $CH_4$ gas adsorption isotherms for a Linde Type A zeolite ("Reference") and Samples 6 through 10.

FIG. 2B shows both the $CO_2/CH_4$ equilibrium selectivity factors for the Reference Sample ("Reference") and Samples 1-5 at a temperature of 323 K and a pressure of 8 bars and the percentage of remaining $CO_2$ capacity for the Reference Sample ("Reference") and Samples 1-5 at T=323 K and P=8 bars. The values used to calculate the selectivity factor values for $CO_2$ to $CH_4$ at P=8 bars were determined using the gas adsorption capacity values for $CO_2$ and $CH_4$ in FIG. 2A. The results indicate that Samples 1-5 exhibit very low selectivity enhancement, and that the decationization of the zeolite precursor does not show significant narrowing with respect to pore size.

The gas adsorption capacity of Samples 1 through 10 was tested using a volumetric adsorption unit (Micromeritics ASAP2050) at a temperature of 323 K and a pressure range from 0 to 8 bars. The resulting $CO_2$ and $CH_4$ gas adsorption isotherms for the Reference Sample ("Reference") and those of Samples 6-10 are presented in FIG. 3. An absorptive equilibrium was assumed to have been reached when a pressure change of less than 0.01% over a 30 second interval was observed. The Reference Sample demonstrated the highest adsorption volume for $CO_2$, but it similarly exhibited the highest adsorption for $CH_4$. Samples 6-10 demonstrated decreasing amounts of gas adsorption (both $CO_2$ and $CH_4$) which correlates to decreases in each sample's Na/Al ratio while inversely correlating to the $NH_4NO_3$ concentration used to manufacture Samples 6-10 (Table 1).

The observed gas adsorption decreases may be attributable to the structural transformation of the crystalline zeolite precursor into the amorphous adsorbent composition during the decationization and water treatment procedures. In this regard, the decationized adsorbent did not exhibit a significant decrease in $CO_2$ and $CH_4$ gas adsorption capacity for samples where the Na/Al ratio is in a range of from about 0.60 to about 1.00, and the $CO_2/CH_4$ equilibrium selectivity factor of the decationized adsorbent was not significantly enhanced at T=323 K and P=8 bars.

Figure 4A:
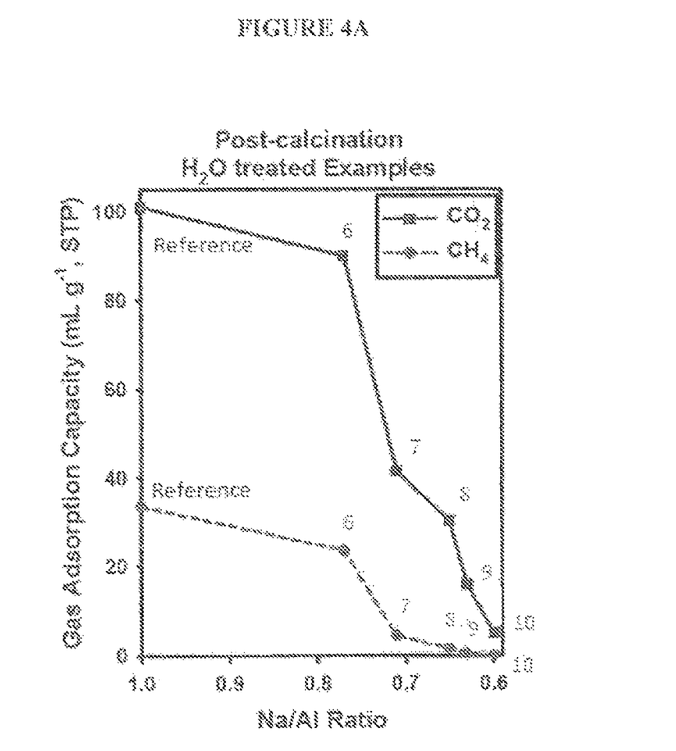
FIG. 4A shows a graph of both the $CO_2$ and $CH_4$ equilibrium gas adsorption capacities for a Linde Type A zeolite ("Reference") and Samples 6 through 10 at T=323 K and P=8 bars.

FIG. 4A shows a graph of both the $CO_2$ and $CH_4$ equilibrium gas adsorption capacities for the Reference Sample ("Reference") and Samples 1 through 10 at a temperature of 323 K and a pressure of 8 bars. The gas adsorption capacity for carbon dioxide and methane at a pressure of 8 bars was determined using the values provided in FIG. 3. The results herein demonstrate that $CO_2$ and the $CH_4$ adsorption capacities decrease as the zeolite structural collapse becomes more extensive with the corresponding increase in ammonium nitrate ($NH_4NO_3$) concentration in the ion-exchange material. For instance. Sample 10 was synthesized using the highest concentration of $NH_4NO_3$ (0.42 M) and did not demonstrate any significant methane adsorption.

A comparison of the separation between the $CO_2$ and $CH_4$ equilibrium gas adsorption in FIG. 4A suggests that $CH_4$ adsorption capacity decreases more rapidly than that observed for $CO_2$. These results suggest that in view of the kinetic diameter of $CH_4$ being greater than that of $CO_2$, $CH_4$ will be excluded more readily upon a narrowing of the pore size daring the controlled collapse of the zeolite based precursor.

Figure 4B:
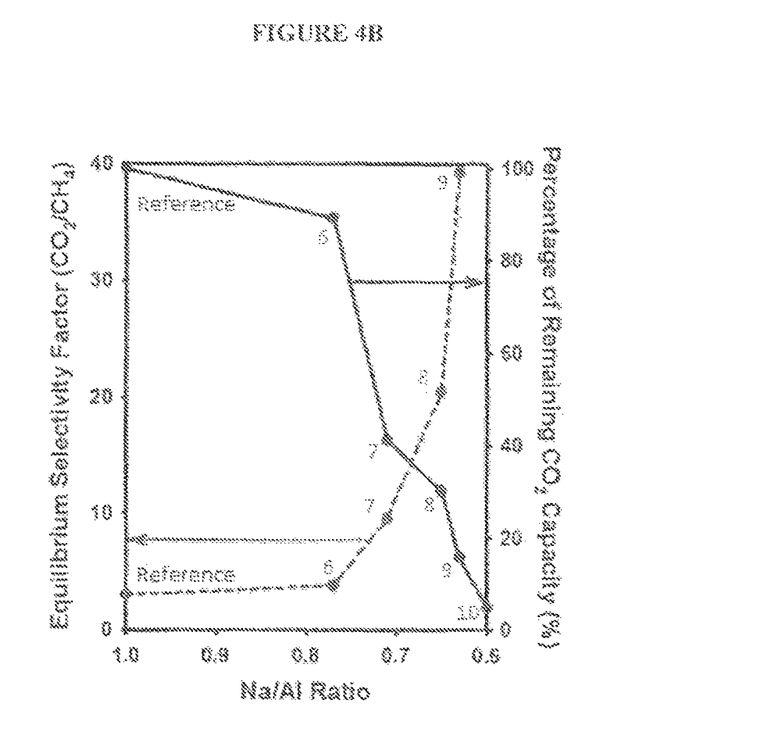
FIG. 4B shows a $CO_2/CH_4$ equilibrium selectivity factor plot for a Linde Type A zeolite ("Reference") and Samples 6 through 9 and the percentage of remaining $CO_2$ capacity for a Linde Type A zeolite ("Reference") and Samples 6 through 10 at T=323 K and P=8 bars.

FIG. 4B shows $CO_2/CH_4$ equilibrium selectivity factors for the Reference Sample ("Reference") and Samples 6 through 10 as well as the percentage of remaining $CO_2$ capacity for the Reference Sample ("Reference") and Samples 6 through 10 at a temperature of 323 K and a pressure of 8 bars. The values used to calculate the selectivity factors for $CO_2$ and $CH_4$ at the disclosed pressure were determined using the gas adsorption capacity values for both carbon dioxide and methane in FIG. 4A. As described above, Sample 10 does not demonstrate any significant methane adsorption, and consequently demonstrated an undefined (infinite) $CO_2/CH_4$ equilibrium selectivity factor.

As shown in FIG. 4B, the Reference Sample—a Linde Type A zeolite—demonstrates an equilibrium selectivity factor of only about three times greater selectivity for $CO_2$ than for $CH_4$ at T=323 K and P=8 bars, while Samples 6-9 exhibit $CO_2/CH_4$ equilibrium selectivity factors greater than 3.0. Sample 6 produced a $CO_2/CH_4$ equilibrium selectivity factor in a range of about 3.8 to about 10 with a $CO_2$ gas adsorption capacity. In addition, Sample 6 exhibited about 90% to about 95% of the adsorption value produced by the Reference Sample. Samples 7 and 8 demonstrated equilibrium selectivity factors in a range of about 10 to about 20. Sample 8 exhibited significant $CO_2$ gas adsorption capacity (equilibrium selectivity factor of about 50 to about 60) in comparison with the Reference Sample. In addition, Sample 9 produced a $CO_2/CH_4$ equilibrium selectivity factor of about 35 to about 40 and a $CO_2$ gas adsorption capacity in a range of from about 15% to about 20% of the Reference Sample's capacity.

In some embodiments, the amorphous adsorbent advantageously is characterized by an equilibrium selectivity factor of $CO_2/CH_4$ in a range of from about 3.8 to about 40, preferably in a range of from about 10 to about 40. In further embodiments, the amorphous adsorbent exhibits a $CO_2$ gas adsorption capacity in a range of from about 15% to about 95% of the capacity of the aluminosilicate zeolite used to form the amorphous adsorbent, preferably in a range of about 15% to about 45%.

Although the present invention has been described in detail, it should be understood that various changes, substitutions, and alterations can be made hereupon without departing from the principle and scope of the invention. Accordingly, the scope of the present invention should be determined by the following claims and then appropriate legal equivalents.

The singular forms "a", "an" and "the" include plural references, unless the context clearly dictates otherwise.

"Optional" or "optionally" means that the subsequently described component may or may not be present or the event or circumstances may or may not occur. The description includes instances where the component is present and instances where it is not present, and instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

What is claimed is:

1. An amorphous adsorbent composition for purifying hydrocarbon gas fractions comprising:
    a hydrolyzed, partially collapsed Linde Type A aluminosilicate zeolite; and
    a plurality of pores characterized by a pore aperture size of from about 0.33 nm to about 0.38 nm;
    wherein the composition is characterized by a carbon dioxide/methane equilibrium selectivity factor in a range of about 3.8 to about 40.

2. The composition of claim 1, wherein the composition has a Na/Al ratio in a range of from about 0.60 to about 1.00.

3. The composition of claim 1, wherein the composition is hydrolyzed using deionized water.

4. The composition of claim 3, wherein the deionized water is present in a phase selected from the group consisting of liquid, saturated steam and superheated steam.

5. The composition of claim 1, wherein the composition is decationized and calcined prior to hydrolysis.

6. The composition of claim 5, wherein the composition is calcined at a temperature between about 473 K and about 773 K.

7. The composition of claim 1, wherein the composition is operable at a temperature in a range of between about 273 K and about 323 K.

8. The composition of claim 1, wherein the composition is operable at a pressure in a range of between about 1 bar and about 8 bars.

9. The composition of claim 1, wherein the composition further comprises one or more cations selected from sodium, ammonium and combinations thereof.

10. A method for synthesizing an amorphous adsorbent material capable of purifying a gas fraction comprising:
    combining at least a stoichiometric amount of a compound comprising at least one exchangeable cation with a stoichiometric amount of a sodium Linde Type A aluminosilicate zeolite compound under temperature and pressure conditions suitable for promoting cation exchange between the compound comprising at least one exchangeable cation and the sodium Linde Type A aluminosilicate zeolite compound;
    isolating the Linde Type A aluminosilicate zeolite compound comprising the exchangeable cation;
    calcinating the Linde Type A aluminosilicate zeolite compound comprising the exchangeable cation under conditions such that the Linde Type A aluminosilicate zeolite compound undergoes at least a partial structural collapse and the exchangeable cation is removed to form a calcinated amorphous adsorbent precursor; and
    hydrolyzing the calcinated amorphous adsorbent precursor under conditions appropriate for forming a plurality of pores characterized by a pore aperture size of from about 0.33 nm to about 0.38 nm.

11. The method of claim 10, wherein the compound comprising at least one exchangeable cation is ammonium nitrate.

12. The method of claim 10, wherein the step of calcinating is performed at a temperature in a range of about 473 K to about 773 K.

13. The method of claim 10, wherein the step of calcinating is performed at a pressure in a range of about 1 bar to about 8 bar.

14. A method for purifying a natural gas fraction comprising the steps of:
    introducing a natural gas fraction into a vessel containing the composition of claim 1, where the introduced natural gas is a non-upgraded natural gas comprising non-combustible gases and where the amorphous adsorbent is characterized by a carbon dioxide/methane equilibrium selectivity factor in a range of about 3.8 to about 40;
    contacting the natural gas fraction with the composition of claim 1; and
    maintaining the natural gas traction in the vessel containing the composition of claim 1 for a sufficient time such that the concentrations of the non-combustible gases are reduced in the natural gas fraction.

* * * * *

UNITED STATES PATENT AND TRADEMARK OFFICE
CERTIFICATE OF CORRECTION

| | | |
|---|---|---|
| PATENT NO. | : 9,333,482 B2 | Page 1 of 1 |
| APPLICATION NO. | : 14/605645 | |
| DATED | : May 10, 2016 | |
| INVENTOR(S) | : Yuguo Wang et al. | |

It is certified that error appears in the above-identified patent and that said Letters Patent is hereby corrected as shown below:

On the title page item (72), line 3, "Chol" - It should read "Choi"

In the claims,
Column 12, In Claim 14, line 46 the claim language "maintaining the natural gas traction in the vessel" - should read - "maintaining the natural gas fraction in the vessel"

Signed and Sealed this
Twelfth Day of July, 2016

Michelle K. Lee
*Director of the United States Patent and Trademark Office*